US012729322B2

(12) United States Patent
Czaplicki et al.

(10) Patent No.: US 12,729,322 B2
(45) Date of Patent: Sep. 8, 2026

(54) SINGLE LAYER SELF-ADHERING REINFORCING PATCH

(71) Applicant: Zephyros, Inc., Romeo, MI (US)

(72) Inventors: Michael Czaplicki, Romeo, MI (US); Keith Madaus, Romeo, MI (US); Chris Hable, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 780 days.

(21) Appl. No.: 17/288,808

(22) PCT Filed: Nov. 5, 2019

(86) PCT No.: PCT/US2019/059829
§ 371 (c)(1),
(2) Date: Apr. 26, 2021

(87) PCT Pub. No.: WO2020/097050
PCT Pub. Date: May 14, 2020

(65) Prior Publication Data

US 2022/0010175 A1 Jan. 13, 2022

Related U.S. Application Data

(60) Provisional application No. 62/755,798, filed on Nov. 5, 2018.

(51) Int. Cl.

*C09J 7/10* (2018.01)
*B62D 27/02* (2006.01)
*C09J 11/04* (2006.01)

(52) U.S. Cl.

CPC .............. *C09J 7/10* (2018.01); *B62D 27/023* (2013.01); *B62D 27/026* (2013.01); *C09J 11/04* (2013.01);

(Continued)

(58) Field of Classification Search

CPC . C09J 7/10; C09J 11/04; C09J 2463/00; C09J 2301/408; C08J 2207/02;

(Continued)

(56) References Cited

U.S. PATENT DOCUMENTS 3,920,879 A 11/1975 Segal et al.
4,369,608 A 1/1983 Miura et al.
(Continued)

FOREIGN PATENT DOCUMENTS

CA 2005735 A1 6/1990
CN 1433452 A 7/2003
(Continued)

OTHER PUBLICATIONS

Machine Translation of WO201403552 (Year: 2014).*
(Continued)

*Primary Examiner* — Jennifer A Steele
(74) *Attorney, Agent, or Firm* — Dobrusin Law Firm, P.C.

(57) ABSTRACT

The present teachings generally provide for a reinforcing patch for stiffening vehicle panels. The reinforcing patch may be fabric free (e.g., free of any reinforcing layer). The reinforcing patch may be cut into small shapes, complex shapes, or both. The stiffening material may be free of a mesh or a fabric, which may allow the reinforcing patch material to be easily produced and easily reprocessed. The reinforcing patch may include one or more reinforcing particulates in combination with one or more discontinuous fiber components to obtain stiffness comparable to traditional patches which include a mesh/fabric layer.

19 Claims, 1 Drawing Sheet

(52) U.S. Cl.
CPC ........ *C09J 2400/24* (2013.01); *C09J 2463/00* (2013.01)

(58) Field of Classification Search
CPC .... C08J 2363/00; C08J 9/0066; C08J 9/0085; C08K 3/013; C08K 3/346; C08K 7/02; C08K 7/14; C08K 2201/004; B64F 5/45; B63B 81/00; B29C 73/00; Y10T 137/0441
See application file for complete search history.

(56) References Cited

U.S. PATENT DOCUMENTS 4,378,395 A 3/1983 Asoshina et al.
4,397,914 A 8/1983 Miura et al.
4,399,174 A 8/1983 Tanaka et al.
4,463,652 A 8/1984 Monget
4,830,908 A 5/1989 Nakajima et al.
5,139,843 A 8/1992 Murakami et al.
5,151,327 A 9/1992 Nishiyama et al.
5,190,803 A 3/1993 Goldbach et al.
5,234,757 A 8/1993 Wong
5,266,133 A 11/1993 Hanley et al.
5,575,526 A 11/1996 Wycech
5,708,042 A 1/1998 Hasegawa
5,755,486 A 5/1998 Wycech
5,766,719 A 6/1998 Rimkus
5,888,600 A 3/1999 Wycech
5,932,680 A 8/1999 Heider
6,131,897 A 10/2000 Barz et al.
6,149,227 A 11/2000 Wycech
6,247,287 B1 6/2001 Takabatake
6,270,600 B1 8/2001 Wycech
6,287,666 B1 9/2001 Wycech
H2047 H 9/2002 Harrison et al.
6,455,146 B1 9/2002 Fitzgerald
6,467,834 B1 10/2002 Barz et al.
6,503,585 B1 1/2003 Wagenblast et al.
6,506,494 B2 1/2003 Brandys
6,734,263 B2 * 5/2004 Eadara .................... C08L 63/00 528/121
6,855,652 B2 2/2005 Hable et al.
6,892,993 B2 5/2005 Palmer
6,991,694 B2 1/2006 Rochr
7,125,461 B2 10/2006 Czaplicki et al.
7,144,071 B2 12/2006 Le Gall et al.
7,199,165 B2 4/2007 Kassa et al.
7,249,415 B2 7/2007 Larsen et al.
7,290,079 B2 10/2007 Zsohar
7,313,865 B2 1/2008 Czaplicki et al.
7,521,093 B2 4/2009 Finerman et al.
7,527,850 B2 5/2009 Muto et al.
7,784,186 B2 8/2010 White et al.
7,941,925 B2 5/2011 Larsen et al.
7,984,919 B2 7/2011 Nitsche et al.
8,002,332 B2 8/2011 Coon et al.
8,105,460 B2 1/2012 Sheasley et al.
8,181,327 B2 5/2012 Apfel
8,236,128 B2 8/2012 Kassa et al.
8,545,956 B2 10/2013 Hoefflin
8,668,046 B2 3/2014 Lecroart et al.
9,708,013 B2 7/2017 Belpaire
2001/0036559 A1 11/2001 Haack
2002/0009582 A1 1/2002 Golden
2002/0096833 A1 7/2002 Czaplicki et al.
2003/0039792 A1 2/2003 Hable
2003/0045620 A1 3/2003 Carlson et al.
2003/0124300 A1 7/2003 Pierattilio Di et al.
2003/0176128 A1 9/2003 Czaplicki et al.
2003/0183317 A1 10/2003 Czaplicki
2003/0186049 A1 * 10/2003 Czaplicki ........... C08G 59/4021 428/343
2004/0021250 A1 2/2004 Obeshaw et al.
2004/0076831 A1 4/2004 Hable et al.
2004/0130185 A1 7/2004 Hasler et al.
2004/0266898 A1 12/2004 Kassa et al.
2004/0266899 A1 12/2004 Muenz
2005/0166532 A1 8/2005 Barz
2005/0229530 A1 10/2005 Schmidt et al.
2005/0239357 A1 10/2005 Wesch et al.
2005/0260399 A1 11/2005 Finerman
2006/0181089 A1 8/2006 Andre et al.
2006/0188726 A1 8/2006 Muenz et al.
2007/0045866 A1 3/2007 Gray et al.
2007/0072981 A1 * 3/2007 Miller .................... C08K 3/346 524/445
2007/0080559 A1 4/2007 Stolarski et al.
2007/0095475 A1 5/2007 Hable
2007/0101679 A1 5/2007 Harthcock
2007/0116964 A1 * 5/2007 Guo ........................ C23C 26/00 428/416
2008/0014388 A1 1/2008 Mett et al.
2008/0060757 A1 3/2008 Hable et al.
2008/0188609 A1 8/2008 Agarwai
2008/0193751 A1 * 8/2008 Groppel ................... C09J 11/04 428/355 R
2008/0308212 A1 12/2008 Sheasley et al.
2009/0176903 A1 7/2009 Muenz
2009/0202761 A1 8/2009 Malek et al.
2009/0258217 A1 10/2009 Hoefflin et al.
2009/0308534 A1 * 12/2009 Malone .................. C08L 51/04 156/330
2009/0318636 A1 * 12/2009 Bertsch ............. C08G 59/5033 525/534
2010/0021267 A1 1/2010 Nitsche
2010/0225017 A1 9/2010 Nakagawa et al.
2010/0259059 A1 10/2010 Quaderer et al.
2011/0126981 A1 6/2011 Lutz
2011/0236616 A1 9/2011 Belpaire
2011/0257285 A1 10/2011 Barriau et al.
2011/0262735 A1 10/2011 Hoefflin
2012/0164358 A1 6/2012 Schneider
2013/0149531 A1 * 6/2013 Kosal ...................... C08L 23/08 523/438
2013/0216843 A1 8/2013 Mase et al.
2014/0087126 A1 3/2014 Quaderer
2014/0113983 A1 4/2014 Czaplicki
2014/0134905 A1 5/2014 Quaderer
2014/0322493 A1 10/2014 Billette et al.
2014/0378567 A1 12/2014 Chmielewski et al.
2015/0000839 A1 1/2015 Czaplicki
2018/0057717 A1 * 3/2018 Chopin .................... C08J 5/043

FOREIGN PATENT DOCUMENTS

CN 101287794 A 10/2008
CN 101289017 A 10/2008
CN 101802088 A 8/2010
CN 102260466 A 11/2011
CN 103459539 A 12/2013
CN 103509506 A 1/2014
DE 29812843 U1 10/1998
DE 10163248 A1 7/2003
DE 202004009473 U1 10/2004
DE 102004046960 A1 4/2006
DE 102008018538 A1 10/2009
DE 102004060009 B4 5/2014
EP 0061132 A2 5/1987
EP 0298024 B1 6/1988
EP 0625559 6/1998
EP 1084816 A2 3/2001
EP 1456286 A1 9/2004
EP 1557342 B1 2/2008
EP 1759964 A1 12/2009
EP 2350177 A1 8/2011
EP 2409900 1/2012
EP 1456286 B1 * 6/2012 ............. C08G 59/40
EP 2350177 B1 * 1/2013 ......... C08G 59/4021
EP 3152048 B1 6/2019
FR 2749263 B1 7/1998
JP 2003094475 4/2003
WO 1995/025005 9/1995
WO 1998/036944 8/1998

(56) References Cited

FOREIGN PATENT DOCUMENTS

| | | | | | |
|---|---|---|---|---|---|
| WO | 1999/050057 | | | 10/1999 | |
| WO | 2000/046017 | | | 8/2000 | |
| WO | 0109404 | A2 | | 2/2001 | |
| WO | 2001/068437 | A2 | | 9/2001 | |
| WO | 2002/074608 | A1 | | 9/2002 | |
| WO | 2003/000535 | A1 | | 1/2003 | |
| WO | 03/054069 | A1 | | 7/2003 | |
| WO | 2003/054069 | A1 | | 7/2003 | |
| WO | 2004/039577 | A2 | | 5/2004 | |
| WO | 2004/060738 | A1 | | 7/2004 | |
| WO | 2004/078853 | A2 | | 9/2004 | |
| WO | 2005/075189 | A2 | | 8/2005 | |
| WO | 2005/077634 | A2 | | 8/2005 | |
| WO | 2006/044414 | A1 | | 4/2006 | |
| WO | 2007/019330 | | | 2/2007 | |
| WO | 2007/025007 | A1 | | 3/2007 | |
| WO | 2007/082677 | A1 | | 7/2007 | |
| WO | 2007/140870 | | | 12/2007 | |
| WO | 2011/134943 | | | 11/2011 | |
| WO | WO-2014103552 | A1 | * | 7/2014 | ........... H01L 23/293 |
| WO | 2020/097050 | A1 | | 5/2020 | |

OTHER PUBLICATIONS

PCT International Search Report and Written Opinion, PCT/US2013/031343, dated Jun. 6, 2013.

PCT International Search Report and Written Opinion, PCT/US2013/047484, dated Jan. 15, 2014.

Notice of Opposition in the European Patent Office for Application No. EP17184916.9 (EP3269621) dated May 13, 2020.

Notice of Opposition in the European Patent Office for Application No. EP16169513.5 (EO3093222B1), filed on Sep. 12, 2019.

Decision of Board of Appeal T2714/16/3.2.01 Regarding EP2352665.

Baskin, Donald M. et al. "A Case Study in Structural Optimization of an Automotive Body-in-White Design" SAE Technical Paper Series 2008-01-0880, Apr. 2008.

Tornqvist, Ronni, "A New Level of Performance is Reached with Fabric Reinforced Glass Mat Thermoplastics" SAE Technical Paper Series 2001-01-0101, Mar. 2001.

Internet Malnati, Peggy, "Reinforced Thermoplastics: LFRT v GMT" Aug. 1, 2007 (cited Sep. 10, 2019).

Lord Repair Procedure, Composite Plastic Body Panel Installation and Sectioning Procedure Using Lord Fusor Plastic Repair Systems (1 page).

Light Structures Article, Presentation Ecology and Safety as a Driving Force in the Development of Vehicles, Random, 2—Mar. 15, 2008, Poland.

Krupitzer, Ronald P. et al., "Improvements in the Dent Resistance of Steel Boxy Panels" SAE Technical Paper Series 920243, Feb. 1992.

Oda, Nobutaka et al, "A Method of Predicting Dent Resistance of Automobile Body Panels" SAE Technical Paper Seriews 50574, 1995.

India First Examination Report dated Aug. 23, 2019, Application No. 1765/KOLNP/2015.

Communication of a notice of opposition by Sika Technology AG including exhibits, EP Application No. 13803328.7 (Patent No. EP2920046) dated May 23, 2018.

Extended European Search Report for Application No. 17184916.9 dated Nov. 30, 2017.

Communication Pursuant to Article 94(3) EPC, Application No. 13803328.7, Dated Jul. 26, 2016.

Chinese Second Office Action, Application No. 201380059665.3 dated Feb. 3, 2017.

Chinese Second Office Action dated Mar. 29, 2021, Application No. 201780016910.0.

Chemical Dictionary (Ma Sicang, p. 421, Shaanxi Science and Technology Press, Apr. 1999 (in Chinese).

International Search Report & Written Opinion dated Apr. 9, 2014, Application No. PCT/US2013/070059.

Chinese Office Action dated Jun. 3, 2016; Application No. 201380059665.3.

International Preliminary Report on Patentability dated May 28, 2015, Application No. PCT/US2013/070059.

Notice of Opposition for European Application 13803328.7, dated Sep. 5, 2018.

Summons to Attend Oral Proceedings for European Application 13803328.7, dated Dec. 12, 2018.

PCT Search Report & Written Opinion dated Aug. 22, 2016, Application No. PCT/US2016/032710.

Chinese First Office Action dated Jul. 27, 2020, Application No. 201780016910.0.

Chinese Search Report dated Jul. 8, 2020, Application No. 201780016910.0.

India First Examination Report dated Sep. 18, 2020, Application No. 201837032596.

European Second Communication dated Aug. 26, 2020, Application No. 17719045.5.

PCT Search Report & Written Opinion dated Jun. 16, 2017, Application No. PCT/US2017/023808.

International Search Report & Written Opinion dated Apr. 28, 2020, Application No. PCT/US2019/059829.

Chinese First Office Action dated Sep. 23, 2022, Application No. 201980072924.3.

Brazil Office Action dated Nov. 23, 2023, Application No. BR112021008681-1.

European First Communication dated Oct. 9, 2023, Application No. 19835933.3.

* cited by examiner

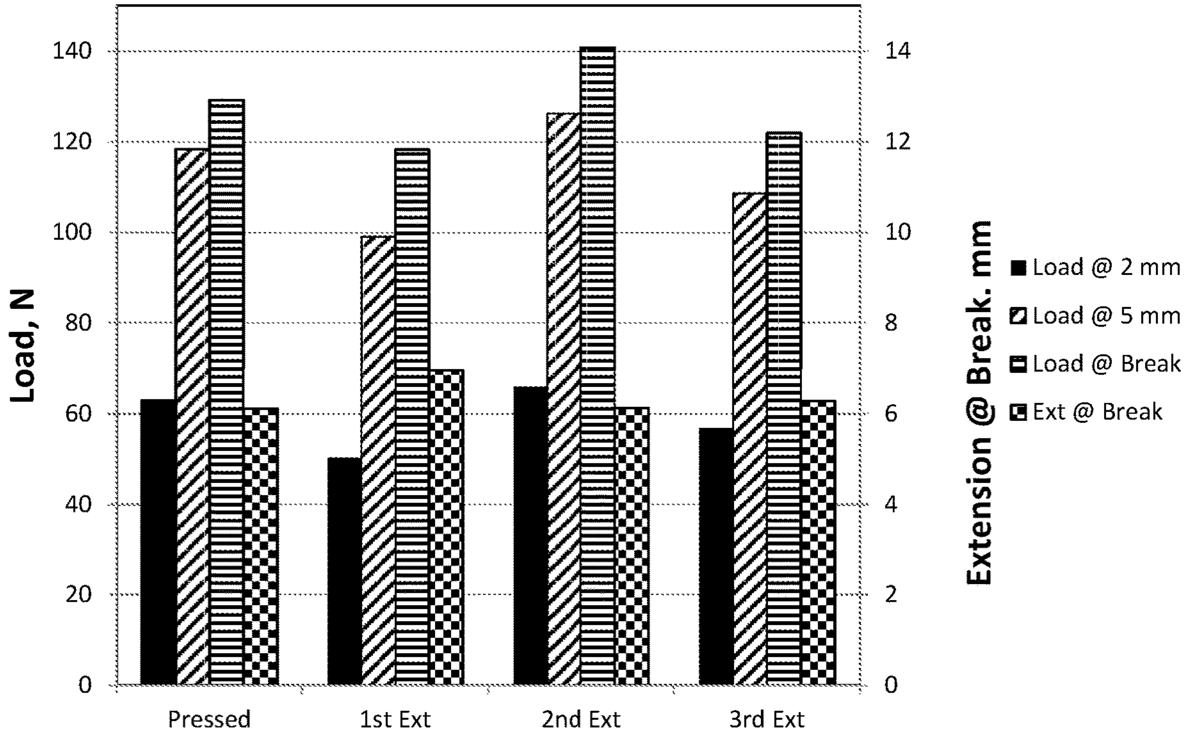
Load, N
0
20
40
60
80
100
120
140
Extension @ Break. mm
0
2
4
6
8
10
12
14
Pressed
1st Ext
2nd Ext
3rd Ext
Load @ 2 mm
Load @ 5 mm
Load @ Break
Ext @ Break

SINGLE LAYER SELF-ADHERING REINFORCING PATCH

TECHNICAL FIELD

The present teachings relate generally to a single layer self-adhering stiffening and reinforcing patch as well as its use in reinforcing thin gauge sheet metal and other thin light-weight structures. The single layer construction allows for simplified manufacturing and minimizes waste in the production of the patch.

BACKGROUND

Due to ongoing challenges with fuel economy requirements, the gauge of metal used in the automotive industry has reduced dramatically over the past several years. Specifically, the gauge of metal used to make doors, sliding doors, tailgates and truck bed sides has decreased from about 1.2 mm to about 0.7 mm over the past five years. As one example, aluminum materials are utilized to a greater extent due to their reduced weight as compared to other metallic materials. To meet strength requirements in certain areas of the vehicle, the use of reinforcing patches to reinforce specific areas of the thinner metal has become more common. A class of materials known as panel stiffeners (e.g., reinforcing patches) has been used to help stiffen these areas of the vehicle. These reinforcing patches prevent deformation of the sheet metal including dents, waves, "oil canning" and other undesirable modifications to the exterior surface of a vehicle. Common places of usage of reinforcing patches are in doors, particularly around door handles, hoods, trunks and quarter panels. Reinforcing of key areas while minimizing additional weight gain often requires patches of complex shapes.

Reinforcing patches for panel reinforcement are typically of a dual layer construction consisting of a layer of thermosetting adhesive together with a non-reacting reinforcing layer. The adhesive can be any thermosetting adhesive that provides sufficient green state adhesion prior to heat activation. Further, the adhesive must avoid sag during expansion and cure, as any sagging could cause exposure of bare, untreated metal and subsequent undesirable corrosion. The adhesive should further have sufficient cured properties such as high modulus and long-term adhesion durability. The thermosetting layer is often laminated to the reinforcing layer to achieve necessary reinforcing properties. The reinforcing layer is generally composed of an inert non-curing material, typically a fiberglass fabric or mesh. The fiberglass fabric or mesh can present challenges by making the patch material difficult to cut. In addition, scrap material from the cutting of complex shapes can be very difficult to recover for reuse.

Epoxy based adhesives are often utilized due to their adhesion to metal and high modulus. The reinforcing layer can be metal, glass or thermoplastic sheets to name a few. However, glass fabrics tend to give the highest modulus for the panel stiffener, while maintaining formability prior to cure of the adhesive. Adhesives with foaming capabilities are particularly desirable given that the cured thickness increases the cross-sectional moment of inertia and ultimately decreases both temporary and permanent deflection of the panel caused by external forces.

The present teachings overcome current concerns with manufacturing and production of patches including a mesh or fiber reinforcing layer by providing a single layer, self-adhering reinforcing patch for use in reinforcement of thin gauge sheet metal and thin walled composite panels. The self-adhering patch cures with heat at temperatures typically used in automotive paint bake ovens. The self-adhering patch is free of a second reinforcing layer such as woven fiberglass fabric. The reinforcing layer-free material provides low cost and flexibility in part design and simplified recovery and reuse of offal generated in the process of part manufacture.

SUMMARY OF THE INVENTION

The teachings herein contemplate a reinforcing patch (e.g., a stiffening and reinforcing patch) and method for the structural reinforcement of metallic panels and stampings with a reinforcing patch. The reinforcing patch disclosed herein may be free of a fabric or a mesh or any structural support layer or reinforcing layer and may allow for effective reinforcing of a cavity or a panel where little or no additional fastening steps or fastening means are required. The reinforcing patch may be tacky in nature prior to cure so that it can be located onto a panel with no additional fastening means. The reinforcement material of the present teachings may utilize a discontinuous fiber component (e.g., a long fiber component) and a reinforcing particulate to provide a reinforcing patch that is free of a fabric or mesh, allowing the material to be easily reprocessed (e.g., recycled). Reinforcing patches having a reinforcing fabric may create problems with reusing or recycling of offal when cutting smaller patches or complex shapes, as the fabric may not effectively recycle into the adhesive. Thus, without the fabric, the material should be able to be reprocessed. By incorporating the combination of reinforcing particulate and discontinuous fiber components, the reinforcing patch may achieve high stiffness with a sufficient displacement to failure comparable to reinforcing patches with a fabric/mesh layer.

The present teachings meet one or more present needs by providing a reinforcing patch for panel stiffening comprising an adhesive including: one or more reinforcing particulates; and one or more discontinuous fiber components; wherein the reinforcing patch is free of any reinforcing layer.

The adhesive may further include one or more epoxide functional systems (polymer contains reactive epoxide functionality (contains an oxirane ring)), one or more curing agents, one or more modifiers, one or more curing agent accelerators, and one or more blowing agents. The one or more reinforcing particulates may be mica. The reinforcing patch may be about 10% to about 60% by weight of the one or more reinforcing particulates. The reinforcing patch may be about 1% to about 10% by weight one or more discontinuous fiber components. The one or more discontinuous fiber components may be chopped glass, chopped aramid, aramid pulp or some combination thereof. The one or more discontinuous fiber components have an average length of about 1 mm to about 30 mm, about 3 mm to about 15 mm, or about 4 mm to about 10 mm.

The reinforcing patch may be foamable. The reinforcing patch may have a vertical expansion of from about one (0% expansion) to about three times its initial height in its green state. The reinforcing patch may have a peak load greater than 90N or even greater than 120N (when tested in a 3-point bend configuration). The reinforcing patch may have an extension break of greater than 5 mm. The reinforcing patch may be about 20% to about 50% by weight of the one or more reinforcing particulates. The reinforcing patch may be about 2% to about 6% by weight one or more discontinuous fiber components. The reinforcing patch may not be flexible after activation. The reinforcing patch may be adapted to be reprocessed after being cut into a shape. The reinforcing patch may have an initial thickness of from about 0.1 mm to about 5 mm. The reinforcing patch may have an initial thickness of from about 1 mm to about 3 mm. The reinforcing patch may have a post-cure thickness of from about 0.5 mm to about 7 mm. The reinforcing patch may have a post-cure thickness of from about 1 mm to about 4 mm.

The ratio of the initial thickness to post cure thickness of the reinforcing patch is from about 1:1 to about 1:5. The patch may have a vertical rise of from about 110% to about 400%. The patch may be embossed. The adhesive may include one or more of a liquid epoxy and a liquid epoxy adduct. The adhesive may include both of a liquid epoxy and a liquid epoxy adduct. The adhesive may include at least 20% particulate. The adhesive may include at least 30% particulate. The reinforcing patch may be rigid after activation. The reinforcing patch may be tacky prior to activation and non-tacky after activation. The reinforcing patch may be flexible prior to activation and rigid after activation. The reinforcing particulate may be mica. The adhesive may comprise a polymer matrix material. The reinforcing particulate may increase the elastic modulus of the adhesive. The adhesive may be free of any foaming during cure.

The teachings herein further contemplate a method for stiffening a vehicle body stamping comprising: forming a reinforcing patch comprising an adhesive material; cutting the reinforcing patch into a desired shape; locating the reinforcing patch onto the vehicle body stamping or other panel; and activating the reinforcing material. The reinforcing patch may include one or more discontinuous fiber components and one or more reinforcing particulates. Any surplus of the reinforcing patch left from cutting may be reprocessed.

The method may include exposing the patch to heat to activate the patch. The method may include foaming the reinforcing patch with a stimulus to cause activation and an increase in vertical rise (e.g., height or thickness) of from about 50% to about 300% as compared to the patch in ins green state. The method may be free of any separate fastening step for connecting the automotive reinforcing device to the body stamping. The method may include flexing the automotive reinforcing device to conform to the shape of the body stamping prior to activating the reinforcing material. The step of forming the tacky, self-adhering reinforcing patch may be free of any molding process. The method may include locating one or more handling layers onto the patch. The activating step may include volumetric expansion of from about 50% to about 300% by volume.

BRIEF DESCRIPTION OF THE DRAWINGS

FIG. 1 shows the ability of the reinforcing patches to be reprocessed and the associated physical properties after subsequent reprocessing.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific examples of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/755,798, filed Nov. 5, 2018, the contents of that application being hereby incorporated by reference herein for all purposes.

The present teachings generally provide for a reinforcing patch for stiffening (e.g., reinforcing) panels (e.g. automotive body panels, tail gates, etc.). The reinforcing patch may be fabric free (e.g., free of any constraining or reinforcing layer). A fabric free reinforcing patch may provide for a reinforcing patch that can be cut into small shapes, complex shapes, or both. The reinforcing patch may be free of any reinforcing layer, which may allow the reinforcing patch material to be easily reprocessed. The reinforcing patch may include one or more reinforcing particulates in combination with one or more discontinuous fiber components to obtain stiffness comparable to traditional patches which include a reinforcing layer.

The reinforcing patch of the present teachings may include an adhesive material. The reinforcing patch may be formulated to adhere in its green state (e.g., prior to activation) despite the presence of a number of factors that challenge sufficient adhesion. Included among these factors is contact with heat, cold, and humid conditions in a manufacturing plant and in a paint bake oven. In addition, the surfaces of vehicle cavities are typically coated with a number of lubricants presenting significant challenges to adhesion of reinforcing structures with no additional fastening means. Lastly, most vehicles are subject to an electro coat (e-coat) process including cleaning steps which also has a tendency to cause the reinforcing patch to wash-off the panel and contaminate the e-coat bath. Thus, the adhesives described herein may adhere sufficiently in the green state to avoid the need for separate fasteners. The reinforcing patches described herein may be particularly well suited for adhesion in the green state to a variety of materials, including metals such as steel and aluminum commonly utilized in vehicle manufacture.

The reinforcing patch of the present teachings may be sufficiently tacky at room temperature (e.g., about 23° C.) to enable self-adhesion and may also be tacky at temperatures between about 0° C. and about 80° C.

The reinforcing patch may exhibit reinforcement characteristics (e.g., imparts rigidity/stiffness), strength or a combination thereof to a member. The reinforcing patch may be heat activated to foam or otherwise activate and wet surfaces (upon exposure to heat) which the reinforcing patch contacts. The reinforcing material, after activation, may have a volumetric expansion of about 0%, about 100%, about 300%, or even more. The reinforcing patch may have a vertical expansion of about 1 times to about 3 times the initial height (e.g., thickness) of the adhesive in its green state. After expansion or activation, the reinforcing patch may cure, harden and continue to adhere to the surfaces that it contacts. For application purposes, the reinforcing patch exhibits flexibility, particularly when the reinforcing patch is to be applied to a contoured surface of a vehicle body. Once applied, however, the reinforcing patch may be activatable to soften, expand (e.g., foam), cure, harden or a combination thereof. For example, and without limitation, a typical reinforcing patch will include a polymeric material, such as an epoxy resin or ethylene-based polymer which, when compounded with appropriate ingredients (typically a blowing agent and curing agent), foams and cures in a reliable and predictable manner upon the application of heat or the occurrence of a particular ambient condition. From a chemical standpoint for a thermally-activated material, the reinforcing patch may be initially process flowable material before curing. Thereafter, the base material may cross-link upon curing, which makes the material substantially incapable of further flow.

The self-adhering reinforcing patch of the present teachings is composed of a heat activated, thermosetting resin system, which may be an epoxide functional system, containing reinforcing particulates and fibers. The resin system can consist of any thermosetting system including phenolic, acrylate, methacrylate, urethane or epoxy or some combination thereof. In a preferred embodiment the resin system is composed substantially of epoxide functional systems, resins, oligomers or polymers. The epoxide functional systems may be monofunctional (containing a single epoxy group), difunctional (containing two epoxy groups) or multifunctional (containing 3 or more functional groups). A combination of epoxide functional systems of various molecular weights may be chosen including those that are solid, semisolid or liquid. The amount of solid, semisolid or liquid resin is selected as to assist in achieving a soft pliable consistency together with self-adhering properties. In a preferred embodiment the epoxide functional systems may include one or more epoxy resins which may be selected from diglycidyl ether of bisphenol A resins of different molecular weights. In a preferred embodiment more than 75% of the resin system consists of diglycidyl ether of bisphenol A.

If an epoxide functional system is utilized, the system may include an epoxy which may be aliphatic, cycloaliphatic, aromatic or the like. The epoxy may be supplied as a solid (e.g., as pellets, chunks, pieces or the like), semi-solid, or a liquid. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. One example epoxy resin may be a phenolic resin, which may be a novolac type or other type resin. Other examples of materials for inclusion in the epoxide functional system include a bisphenol-A epichlorohydrin ether polymer, or a bisphenol-A epoxy resin which may be modified with butadiene or another polymeric additive. The base material (e.g., adhesive) may include about 40% by weight, about 50% or more by weight, about 65% or more, or even about 80% by weight epoxy resins.

A substantial portion of the materials in the reinforcing patch may have molecular weights and/or functionality that are low enough to maintain self-adhesive capability of the base material when in its green state. The reinforcing patch may also include flexibilizing and/or elastomeric components that may improve the self-adhesive properties of the reinforcing patch especially on contaminated surfaces (for example metal panels contaminated with stamping lubricants). The flexibilizing and/or elastomeric components may also help to minimize read-through to an opposing surface of a panel that receives the reinforcing patch. Epoxide functional hydrophobic flexibilizers are preferred for improving self-adhesive properties on contaminated surfaces. Highly preferred are epoxide functional cashew nutshell liquid from Cardolite such as NC-513 (monoepoxy) and NC-514 (diepoxy) or epoxide functional dimer fatty acid such as Erisys GS-120 from CVC Specialty Chemicals or Epokukdo YD-171 available from Kukdo Chemical Co., Ltd. Epoxide functional hydrophobic flexibilizers will also improve resistance to wash-off from a panel when the panel is exposed to conditions typically encountered in an automotive assembly process. Wash off resistance is measured on galvanized steel panels coated heavily with stamping lubricant (for example Quaker Ferrocote 61A-US). 36 large drops of lubricant are applied to a 12"×12" panel and the panel is left flat for 1 hour to allow the lubricant to flow evenly over the panel. Then 3 inch by 5 inch patches of the panel reinforcing material are placed on the lubricated panel and left in a horizontal position for 2 hours to allow the patch to absorb lubricant and adhere to the panel. The panel is then placed at a 45 degree angle under a 0.25 L/s flow of 38 to 43° C. water. The flow of water is directed on the metal panel 1 inch above the patch and one inch in from the lateral edge of the reinforcing patch. The time is measured until lifting of the patch from the metal panel occurs. Acceptable performance is consider a time of great than 45 seconds before delamination of the patch begins to occur. To achieve improved wash-off resistance, the amount of epoxide functional hydrophobic flexibilizers may be from about 2 percent to about 5 percent by weight or higher. For an elastomer-based or epoxy-based base material, the reinforcing patch may have at least about 5% by weight of the elastomer or epoxy materials having a molecular weight of less than about 1000 g/mol. The reinforcing patch may include at least about 10% by weight of the elastomer or epoxy materials having a molecular weight less than about 1000 g/mol. The reinforcing patch may have at least about 1% by weight, about 5% by weight, or even at least about 10% of the components with a low enough molecular weight to be a liquid at about 23° C. It is also contemplated that, for maintaining adhesive capability, components such as plasticizers or processing oils may be added to elastomer-based or epoxy-based materials. The reinforcing patch may also contain a high molecular weight elastomer that can contribute to self-adhesion and reduce cold flow in the uncured state and help to minimize read-through in the cured state. Suitable elastomers may include epoxidized natural rubber such as Epoxyprene-25 or Epoxyprene-50 both available from Muang Mai Guthrie Public Company Limited.

Some resin systems according to the present teachings may be self-crosslinking. For example, phenolic resins and urethane resin systems can be selected to be self-crosslinking with heat although accelerators may be added to control the activation temperature and speed of cure. Acrylate and methacrylate resin systems may require use of a catalyst, typically a free-radical generator. Preferred catalysts are heat activated organic peroxides. An example of a heat activated organic peroxide capable of initiating cure of acrylate or methacrylate resins at elevated temperature is dicumyl peroxide.

The epoxide functional systems of the current teachings may include latent catalysts capable of initiating self-crosslinking of the epoxide functional systems include but are not limited to super acids, imidazoles, ureas and tertiary amines. Curing agents suitable for addition reaction with epoxy resins at elevated temperatures include blocked polyamines and solid polyamines that melt or dissolve in the epoxy resin at elevated temperatures. The solid polyamines may be aromatic or aliphatic. An example of an aromatic polyamine suitable for curing the epoxide functional systems of the current teachings is 4,4' diaminodiphenyl sulfone. In a preferred embodiment the heat activated curing agent is dicyandiamide.

Optional accelerators can be added to lower the temperature or time required to crosslink the epoxide functional systems with epoxide curatives. Suitable accelerators for epoxide curatives include but are not limited to imidazoles, blocked amines, tertiary amines and substituted ureas. A preferred accelerator is 4,4'-methylene bis (phenyl dimethyl urea). The level of curing agent accelerator is selected to cure in reduced time and/or reduced temperature (i.e. greater than 95% of epoxy groups reacted) at temperatures of about 150° C. to about 200° C. for about 20 to 30 minutes.

The self-adhering reinforcing patch of the present teachings may contain a high level of reinforcing particulate. One characteristic of some reinforcing particulates is an aspect ratio of greater than 1. Aspect ratio is defined as the ratio of the largest dimension of the particulate particle divided by the smallest dimension of the particulate particle. High aspect ratio particulates include particulates with particle shapes such as flakes, platelets, rods, needles, rectangles. Particulate materials with high aspect ratios include talc, some clays such as kaolinite, glass flake, montmorillonite, and sepiolite, micas such as phlogopite and muscovite and wollastonite. The particulate may be a wollastonite material with and aspect ratio of 3-4 or higher. The particulate may be a phlogopite mica or muscovite with an aspect ratio of 30-40 or higher. For the wollastonite, phlogopite, or muscovite the filler level may be greater than 25% by weight and more preferably greater that 30% by weight of the total formulation. The purpose of these fillers may be to increase the apparent elastic modulus of the polymeric matrix material.

Another characteristic of some reinforcing particulates is a high surface area to volume ratio of the particulate. This is achieved by having a high aspect ratio or preferentially by having a very small particle size (e.g., about 20 nm to about 1000 nm or less than about 4 microns). For example, if mica is selected as a reinforcing particulate, the aspect ratio may be at least about 40 (e.g., from at least 40 to about 100). If wollastonite is utilized, the aspect ratio be at least about 3 (e.g., from about 3 to about 20). Reinforcing particulates of such very small size include carbon black, precipitated silica, precipitated calcium carbonate and fumed silica. Such particulates are suitable for use in the current teachings alone or in combination with a high aspect ratio particulate.

When employed, the reinforcing particulates in the reinforcing patch can range from about 10% or less to about 90% or greater, from about 25% to about 55%, or even 30% to about 45% by weight of the adhesive for forming the patch. Powdered (e.g. about 0.01 to about 50 micron, about 1 to 25 micron mean particle diameter) mineral type particulate can comprise between about 5% or less to about 70% or greater by weight, or even about 10% to about 50% by weight may be present in the reinforcing material. The one or more particulates along with the one or more discontinuous fiber components may provide exceptional rigidity and may increase overall strength after activation while allowing the reinforcement to be cut into small shapes, complex shapes, or both while maintaining the ability to reprocess the reinforcing material. Absent the discontinuous fiber component, the material may maintain its stiffness at low displacement, but a high extension before breaking and a high peak load may not be achieved.

The reinforcing patch may include a discontinuous fiber component. The discontinuous fiber component may function to stiffen the material and the panel to which the reinforcing patch is attached, but its most important contribution is increasing deformation displacement before failure (e.g., upon fracture of the material generally indicated when peak load is reached). The discontinuous fiber component of the reinforcing patch may be made of one or more types of reinforcing filler. The discontinuous fibers may have an average length of about 1 mm to about 30 mm, about 3 mm to about 15 mm, or even about 4 mm to about 10 mm. The discontinuous fiber component may be aggregates, hollow material, chopped material or otherwise, or any combination thereof. The discontinuous fiber component may be composed, for example, of fibers of glass (e.g., E-glass or S-glass), fiberglass, polyamide (Nylon), polyester, carbon, aramid, plastics, polymers (e.g., thermoplastics such as polyamides (e.g., nylon), polycarbonate, polyethylene, polypropylene, polybutylene (e.g., polybutylene terephthalate), polystyrene, polyurethane, vinyl, or any combination thereof), or other materials.

The fibrous material may be in the form of a straight fiber or in the form of a pulp (e.g., fractured along the longitudinal axis). The fibers may also be crimped. The fiber may comprise chopped fiberglass. The fiberglass may be milled (e.g., milled glass) The fibrous material may be an aramid fiber or pulp. Combinations of chopped fiberglass and aramid fiber or pulp are also possible.

Generally, longer fiber lengths are preferred and fiber length is limited by the ability to completely mix and form the patch during the manufacturing process. Fiber lengths of about ¼ inch or 6 mm can normally be processed without difficulty and fibers of ½ inch or longer are beneficial if they can be used. Total fiber content may be from about 2% to about 15%. Total fiber content may be from about 6% to about 8%.

The self-adhering reinforcing patch of the present teachings optionally may contain other additives such as modifiers, tougheners, impact modifiers, blowing agents and pigments. The self-adhering patch may foam upon heating and curing to about 1.5 to 3 times its original thickness, or even to about two times its original thickness. Suitable blowing agents include physical blowing agents such as those available from Akzo Nobel under the trade name Expancel. Chemical blowing agents are also suitable and may include alkali and alkali earth bicarbonates and hydrazides, N,N'-dinitrosopentamethylenetriamine and/or OBSH. A preferred blowing agent is azodicarbonamide. Optionally, one or more activators can be added to lower the temperature at which the blowing agent decomposes and releases gas.

Optionally an impact modifier may be added. The impact modifier may be in the form of a core-shell particle consisting of a soft rubber core material and harder outer shell that is more compatible with epoxide functional systems of the current teachings. The core-shell particles may be non-agglomerated in epoxy resin and available under the trade name KaneAce and available from Kaneka Texas Corporation.

The adhesive may further include a component that plasticize and/or cause phase separation. The plasticizer may be a solid or liquid rubber that upon cure forms a distinct phase having a reduced glass transition temperature ($T_g$). The rubber may be added alone or in the form of an adduct (which has been reacted with an epoxide functional component). Preferred impact modifiers of this type are the carboxyl terminated nitrile rubber products available under the trade name HyPox and available from Emerald Performance Materials.

The reinforcing patch may include one or more modifiers which may improve strain to failure). The presence of certain polymers without epoxy reactivity in the reinforcing patch can lead to the increased elongation at break and/or flexibility of the cured structural adhesive material. For the purpose of specification, polymers of this type are referred to as "modifiers". This term also includes elongation promoting additives. For the purpose of specification, the term "modifier" refers to a single modifier or to a combination of multiple different modifiers. The modifiers may act as plasticizing agent that is compatible with epoxide functional systems but forms domains in the cross-linked epoxy molecules that promote the ability of the material to deform without breaking and/or reduced crack propagation tendency. Modifiers are useful in increasing overall polymer matrix plasticity which in turn makes the addition of other types of toughening agent more effective by, for example, phase separation of rubber modified epoxies and the use of core/shell impact modifiers. The reinforcing patch comprises, relative to the total weight of the reinforcing material, about 2% or more, about 3% or more, or even about 5% or more by weight modifier. The reinforcing patch comprises, relative to the total weight of the reinforcing material, about 50% or less, about 35% or less, or even about 20% or less by weight modifier. Examples of modifiers that may be contained in the reinforcing patch are hydroxy terminated urethane polymers or prepolymers and blocked isocyanates. Isocyanate termination may be avoided however, as this can produce simple component materials that have limited shelf stability due to the reaction of the isocyanate functionality with moisture, either atmospheric, or within the material. Other examples of modifiers include but are not limited to polymers that are amine modified, epoxy modified, or both. These polymers can include but are not limited to thermoplastics, thermosets or thermosettables, elastomers, combinations thereof or the like. These polymers may be modified with aromatic or non-aromatic epoxy and/or may be modified with bisphenol-F type, bisphenol-A type, combinations thereof or other epoxy type. The reinforcing patch may be free of the one or more modifier.

The self-adhering reinforcing patch material, when fully cured, may have a modulus of elasticity of from about near zero to about 20 GPa. The self-adhering reinforcing patch material may have a modulus of elasticity of from about 2 to about 12 GPa. The modulus of elasticity may be >2 GPa, or even >3 GPa.

The self-adhering reinforcing patch material of the present teachings can be compounded in a batch or continuous mixing process. Suitable equipment for a batch mixing process is a sigma blade double arm mixer. Alternatively, the material may be compounded by a continuous processing using a twin screw extruder. The twin screw extrusion process provides the possibility of converting directly to sheet product through and extrusion die. Both batch and continuous process can be used to produce slugs of material that can be used for forming sheets of the patch material in a subsequent process. Slugs of material can be fed into a single screw extruder and formed into a sheet of material through use of an appropriate extrusion die. Because of the self-adhering character of the reinforcing patch, the adhesive material may be extruded onto or between paper or polymeric film with release properties. It is also anticipated that sheets of material from the extrusion process may be passed through a set of calendering rolls to insure evenness and smoothness of surfaces. Slugs of material may also be formed into sheets by use of a press.

The thickness of the sheet, whether formed through extrusion or pressing is determined by the reinforcing requirements of the application but is typically in the range of about 0.2 mm to 6 mm, or even from about 1 mm to about 3 mm. The desired optimized size and shape of the patch may be determined by CAE modeling or experimentation and is typically chosen to minimize weight while providing the needed reinforcement of the panel to which it is applied. Sheets of self-adhering reinforcing patch material are typically cut into a predetermined size and shape to form the final self-adhering reinforcing patch using a die cutting process. A suitable cutting process uses a steel rule die. The self-adhering reinforcing patch may be formed in a continuous process using a rotary die, for example.

The single layer construction allows for design of complex part shapes without waste of material since unused material can be reformed into new sheets usable in the manufacture of additional patches. Holes can be cut in the adhesive, and the material removed can be easily re-used without any treatment to remove the restraining layer. The patch may be designed with an irregular edge such as a scalloped pattern or zig-zag pattern. Such patterned edges are beneficial in reducing stress lines that are evidenced as read-through that otherwise might form upon curing, especially on very thin panels.

The lack of a constraining or reinforcing layer may further minimize read-through or other surface deformation issues of the panel receiving the reinforcing patch. The adhesive may be formulated to minimize shrinking of the adhesive (in response to temperature changes or otherwise) in an effort to avoid read-through issues. The adhesive may be formulated so that the coefficient of thermal expansion of the cured adhesive is similar to that of the material for forming the panel which receives the reinforcing patch.

A thin film may be applied to the self-adhering reinforcing patch material to improve the cutting process and aid in handling the patch. However, the thin film may be for handling purposes only and does not act like a constraining or reinforcing layer. The thin film may be composed of ingredients that are similar or identical to those in the adhesive or may be made from a single polymeric material. Polymeric materials suitable for use as a non-reinforcing film include copolymers of ethylene or other olefins, but a large variety of potential compositions exist. The film must be of a composition that softens or melts easily for reincorporation into the adhesive patch material. If used, the film may be in the range of about 25 to 50 microns. The thickness of the self-adhering reinforcing patch may be at least 40 times thicker than any film applied to aid in handling. The film is not essential to the reinforcing function of the reinforcing patch material and does not interfere with reprocessing of self-adhering reinforcing patch material into sheets.

Non-limiting example formulations 1 through 10 and their associated physical properties are set forth at Table 1 below. Table a displays examples of patches made from the adhesive provided for by the present teachings comprising a foamable adhesive with any combination of one or more reinforcing particulates, and one or more discontinuous fiber components. The combination of the one or more reinforcing particulates and the one or more discontinuous fiber components achieve a high stiffness with a high displacement to failure.

The 3-point bend test referenced below is performed in accordance with ASTM D790. Specimens are prepared by laminating the reinforcing patch to the entire surface of a 1 inch by 6 inch metal coupon of 0.8 mm thick cold rolled steel. Other coupon materials may be evaluated as appropriate. The material is heated for an appropriate time and temperature to fully cure the reinforcing patch (for example 325° F. for 30 minutes). The specimen is allowed to cool and then evaluated in at 3 point bend configuration using a 4 inch span loaded in the middle. The specimen is supported on the ends of the span against the cured patch and loaded on the opposite uncoated face of the metal coupon at the center of the span. The supports and loading nose consist of a hemispherical probe with radius of 3.15 mm and the sample is loaded at a rate of 5 mm/min. The load measured at low displacement (for example 1-3 mm displacement) are influenced by the stiffness of the reinforcing patch.

TABLE 1

| | Example 1 | Example 2 | Example 3 |
|---|---|---|---|
| Epoxy Adduct A | 15.0 | 15.0 | 15.0 |
| Impact Modifier A | | 15.0 | 15.0 |
| Impact Modifier B | 15.0 | | |
| Liquid Epoxy Resin A | 25.5 | 25.5 | 18.0 |
| Mixed Mineral Thixotrope | 2.0 | 2.0 | 2.0 |
| Calcium carbonate | 38.0 | | |
| Wollastonite | | 38.0 | 37.3 |
| Chopped Glass | | | 8.0 |
| Dicyandiamide curing agent | 2.0 | 2.0 | 2.5 |
| Curing agent accelerator | 0.6 | 0.6 | 0.6 |
| Blowing agent A | | | 1.5 |
| Blowing agent B | 1.8 | 1.8 | |
| Pigment | 0.1 | 0.1 | 0.1 |
| Total | 100.0 | 100.0 | 100.0 |
| Results of 3 Point Bend Testing, 1 inch wide, 4-inch span on 0.8 mm thick cold rolled steel | | | |
| Initial Thickness, mm | 1.8 | 1.8 | 1.4 |
| Cured Thickness, mm | 5.0 | 4.2 | 3.1 |
| Vertical Rise | 280% | 280% | 200% |
| Load at 1 mm, N | 43.7 | 50.6 | 38.0 |
| Load at 2 mm, N | 77.6 | 96.5 | 67.0 |
| Load at 2.5 mm, N | 75.0 | 114.6 | 79.0 |
| Load at 5 mm, N | | | 120.0 |
| Peak Load, N | 90.8 | 125.5 | 130.0 |
| Extension at Break, mm | | | |

| | Example 4 | Example 5 | Example 6 | Example 7 |
|---|---|---|---|---|
| Polyurethane Flexibilizer/Toughener | | | | 4.0 |
| Epoxy adduct A | 15.0 | 14.6 | 10.0 | |
| Epoxy adduct B | | | | 6.0 |
| Epoxidized natural rubber | | | | 5.0 |
| CTBN modified epoxy | | | 4.6 | |
| Impact Modifier A | 15.0 | 14.6 | 14.6 | 12.0 |
| Liquid epoxy resin A | 20.0 | 22.6 | 21.0 | 26.4 |
| Reactive aliphatic triepoxide diluent | 5.0 | | | |
| Dimer acid modified epoxy | | | 2.3 | 2.5 |
| Mixed Mineral Thixotrope | | 2.0 | 1.5 | |
| Wollastonite | 31.8 | | | |
| Phlogopite mica A | | 41.4 | | |
| Phlogopite mica B | | | 33.6 | |
| Muscovite mica | | | | 33.6 |
| Chopped Glass | 4.0 | | 3.9 | 4.0 |
| Aramid fibers | 4.0 | | 3.9 | |
| Kevlar pulp | | | | 2.0 |
| Curing agent | 2.5 | 2.3 | 2.3 | 3.3 |
| Peroxide curing agent | | | | 0.5 |
| Curing agent accelerator | 0.6 | 0.4 | 0.4 | 0.4 |
| Blowing agent A | 2.0 | 2.0 | 1.8 | |
| Blowing agent B | | | | 0.2 |
| Pigment | 0.1 | 0.1 | 0.1 | 0.1 |
| Total | 100.0 | 100.0 | 100.0 | 100.0 |
| Results of 3 Point Bend Testing, 1 inch wide, 4-inch span on 0.8 mm thick cold rolled steel | | | | |
| Initial Thickness, mm | 1.4 | 1.2 | 1.28 | 1.42 |
| Cured Thickness, mm | 3.19 | 2.65 | 2.1 | 2.46 |
| Vertical Rise | 200% | 221% | 162% | 173% |
| Load at 1 mm, N | 34.0 | 35.0 | 36.0 | 42.6 |
| Load at 2 mm, N | 60.0 | 60.0 | 63.0 | 74.3 |
| Load at 2.5 mm, N | 72.0 | | 75.0 | 88.5 |

TABLE 1-continued

| | | | | |
|---|---|---|---|---|
| Load at 5 mm, N | 104.0 | | 126.0 | |
| Peak Load, N | 106.0 | 67.0 | 155.0 | 131.6 |
| Extension at Break, mm | | | | 4.582 |

| | Example 8 | Example 9 | Example 10 | Example 11 |
|---|---|---|---|---|
| Polyurethane Flexibilizer/Toughener | | 4.0 | 4.0 | 4.0 |
| Epoxy adduct B | | 6.0 | 6.0 | 6.0 |
| Epoxy adduct C | 14.6 | | | |
| Epoxidized natural rubber | | 5.0 | 5.0 | 5.0 |
| Impact modifier A | 14.6 | 14.0 | 14.0 | 14.0 |
| Liquid epoxy resin A | | 21.9 | 21.9 | 21.9 |
| Liquid epoxy resin B | 23.6 | | | |
| Dimer Acid Modified Epoxy | | 5.0 | 5.0 | 5.0 |
| 2-Micron Calcium carbonate | | | | 33.6 |
| 4-micron Calcium Carbonate | | | 33.6 | |
| Phlogopite mica B | 41.6 | | | |
| Muscovite mica | | 33.6 | | |
| Chopped glass | | 4.0 | 4.0 | 4.0 |
| Kevlar pulp | | 2.0 | 2.0 | 2.0 |
| Peroxide curing agent | | 0.5 | 0.5 | 0.5 |
| Curing agent | 3.3 | 3.3 | 3.3 | 3.3 |
| Curing agent accelerator | 0.4 | 0.4 | 0.4 | 0.4 |
| Blowing agent B | 1.8 | 0.2 | 0.2 | 0.2 |
| Pigment | 0.1 | 0.1 | 0.1 | 0.1 |
| Total | 100.0 | 100.0 | 100.0 | 100.0 |
| Results of 3 Point Bend Testing, 1 inch wide, 4-inch span on 0.8 mm thick cold rolled steel | | | | |
| Initial Thickness, mm | 1.04 | 1.45 | 1.42 | 1.47 |
| Cured Thickness, mm | 3.87 | 2.32 | 2.24 | 2.42 |
| Vertical Rise | 372% | 160% | 158% | 165% |
| Load at 1 mm, N | 37.6 | 37.0 | 30.2 | 32.0 |
| Load at 2 mm, N | 46.7 | 64.0 | 52.0 | 56.0 |
| Load at 2.5 mm, N | | 76.0 | 63.0 | 68.0 |
| Load at 5 mm, N | | 121.0 | 109.0 | 117.0 |
| Peak Load, N | 51.1 | 129.0 | 144.0 | 145.0 |
| Extension at Break, mm | | 5.69 | 7.86 | 7.072 |

FIG. 1 shows the ability of the materials described herein to be reprocessed multiple times yet still maintain sufficient physical characteristics. In this case, the material is initially pressed and then subsequently extruded (denoted as "ext") three times and the physical properties are measured as set forth above after each extrusion. Material was extruded on a single screw extruder and formed into sheets appropriately 1.5 mm thick with the use of a extrusion die.

In most applications, it is undesirable for the reinforcing patch to be reactive at room temperature or otherwise at the ambient temperature in a manufacturing environment (e.g. up to about 40° C. or higher). More typically, the adhesive material becomes reactive at higher processing temperatures, such as those encountered in an automobile assembly plant. The reinforcing patch may be foamed upon automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the base material to cause expansion at different temperatures outside the above ranges. Generally, suitable adhesive materials or foams for the reinforcing patch have a range of expansion ranging from approximately 0 to about 500 percent.

Advantageously, the reinforcing patch of the present teachings may be formed or otherwise processed in a variety of ways. For example, the reinforcing materials may be formed by traditional extrusion or with a robotically controlled extruder such as a mini-applicator. This enables the formation and creation of part designs that exceed the capability of most prior art materials. This approach allows for embossing of the patch such that some areas of the patch will be raised above other areas so as to include a design or pattern on the patch. The embossed pattern could also be more complex in shape. The claimed devices further allow for forming patches of non-uniform thickness along the patch (both prior to and after activation). It is possible that the patch may have an average thickness of 1.5 mm throughout, but may be only 0.5 mm thick in some spots but 2.0-3.0 mm in other areas of the patch.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, from 20 to 80, or even from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates examples that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A reinforcing patch for panel stiffening comprising:
an adhesive including:
- i) one or more reinforcing particulates in an amount of greater than 30% by weight of the adhesive;
- ii) one or more discontinuous fiber components;
- iii) an epoxy resin and an epoxy adduct; and
- iv) one or more epoxide functional systems, one or more curing agents, one or more modifiers, one or more impact modifiers, one or more curing agent accelerators, and one or more blowing agents;

wherein the reinforcing patch is free of any reinforcing layer;

wherein the epoxy adduct is present in an amount of about 5% to 10% by weight of the adhesive;

wherein the one or more impact modifiers is a core-shell particle consisting of a rubber core material and a harder outer shell that is compatible with the one or more epoxide functional systems;

wherein the reinforcing patch is tacky prior to activation;

wherein the reinforcing patch is not reactive at room temperature;

wherein the reinforcing patch is not flexible after activation; and wherein the reinforcing patch has an extension at break of about 4.5 mm or greater.

2. The reinforcing patch of claim 1, wherein the one or more reinforcing particulates is mica.

3. The reinforcing patch of claim 1, wherein the reinforcing patch is about 1% to about 10% by weight of the one or more discontinuous fiber components.

4. The reinforcing patch of claim 3, wherein the one or more discontinuous fiber components is chopped glass, chopped aramid, aramid pulp, or some combination thereof.

5. The reinforcing patch of claim 3, wherein the one or more discontinuous fiber components have an average length of about 3 mm to about 15 mm.

6. The reinforcing patch of claim 1, wherein the reinforcing patch is foamable.

7. The reinforcing patch of claim 6, wherein the reinforcing patch has a vertical expansion of from about one to about 3 times an initial height in a green state.

8. The reinforcing patch of claim 1, wherein the reinforcing patch has a peak load greater than 90N or even greater than 120N.

9. The reinforcing patch of claim 6, wherein the reinforcing patch is about 35% to about 45% by weight of the one or more reinforcing particulates.

10. The reinforcing patch of claim 6, wherein the reinforcing patch is about 2% to about 6% by weight of the one or more discontinuous fiber components.

11. The reinforcing patch of claim 1, wherein the reinforcing patch is rigid after activation.

12. The reinforcing patch of claim 1, wherein the reinforcing patch is adapted to be reprocessed after being cut into a shape.

13. The reinforcing patch of claim 1, wherein the reinforcing patch has an initial thickness of from about 0.1 mm to about 5 mm.

14. The reinforcing patch of claim 13, wherein the reinforcing patch has a post-cure thickness of from about 0.5 mm to about 7 mm.

15. The reinforcing patch of claim 1, wherein a ratio of an initial thickness to a post cure thickness of the reinforcing patch is from about 1:1 to about 1:5.

16. The reinforcing patch of claim 1, wherein the reinforcing patch has a vertical rise of from about 110% to about 400%.

17. The reinforcing patch of claim 1, wherein the adhesive is free of any foaming during cure.

18. The reinforcing patch of claim 12, wherein the reprocessing includes the reinforcing patch maintaining its physical properties after being extruded multiple times.

19. The reinforcing patch of claim 1, wherein an aspect ratio of the one or more reinforcing particulates is from at least 40 to 100.

* * * * *